Patented June 6, 1939

2,161,288

UNITED STATES PATENT OFFICE 2,161,288

MANUFACTURE OF TANNING SUBSTANCES

Rudolf Fingado and Hans Hertlein, Leverkusen I. G. Werk, Germany, assignors to I. G. Farbenindustrie Aktiengesellschaft, Frankfort-on-the-Main, Germany No Drawing. Application September 27, 1937, Serial No. 165,924. In Germany October 2, 1936

8 Claims. (Cl. 149—5)

Our present invention relates to the manufacture of tanning substances from lignin sulfonic acid compounds.

In accordance with one feature of our invention the tanning capacity of lignin sulfonic acid or the soluble salts thereof and especially of sulfite cellulose waste liquor is improved by incorporating therewith such condensation products as are obtainable by condensing aromatic hydroxy compounds with carbohydrates. In accordance with a further feature of this invention these mixtures may be subjected to an aftertreatment with aldehydes or agents capable of splitting off aldehydes. For this purpose, formaldehyde has proved to be especially suitable. The said after-treatment with an aldehyde is preferably performed at an elevated temperature.

The condensation products of aromatic hydroxy compounds and carbohydrates in order to be suitable as starting material for our invention should be dispersible in solutions of lignin sulfonic acid compounds, especially in sulfite cellulose waste liquor. Such condensation products from aromatic hydroxy compounds and carbohydrates are known and have been described in literature. Owing to their insolubility in water they cannot be employed for tanning purposes. In contradistinction thereto, the new compositions obtained in accordance with the present invention constitute perfectly clear liquids which can be mixed with water in all proportions and possess good tanning properties. As regards tanning effect they resemble vegetable tanning agents, the products which have been subjected to the after-treatment with aldehydes yielding better filled leathers than the original mixtures.

The aforementioned condensation products from carbohydrates and aromatic hydroxy compounds can be prepared, for example, as described in German specification No. 247,181 and in the U. S. patent specification No. 1,593,342. As aromatic hydroxy compounds phenol and cresol are preferred. Among the carbohydrates or mixtures thereof can be employed, for example, dextrose, starch, cane sugar, cellulose, wood or straw. The condensation products obtainable therefrom may be incorporated with the sulfite cellulose waste liquor by simply stirring a mixture thereof, preferably at an elevated temperature. Tanning agents of good practical value are obtained by employing the said condensation products in quantities of about 5% calculated on the amount of sulfite cellulose waste liquor having a dry content of about 60%. The upper limit of the amount of condensation products to be employed must be so selected that the mixture of the two components is still a perfectly clear liquid.

The following examples illustrate the invention, without, however, restricting it thereto, the parts being by weight:—

Example 1

100 parts of a resin prepared from 100 parts of glucose, 350 parts of phenol and 15 parts of concentrated hydrochloric acid with subsequent blowing off of the excess phenol by means of steam are dispersed in 1000 parts of thickened sulfite cellulose waste liquor of 35° Bé. while stirring at 50° C.

A dark red-brown substance of good water-solubility is obtained which yields, when used as a tanning agent after diluting with water and acidifying with formic acid to a slight acid reaction to Congo red, a solid light-brown full leather.

Example 2

80 parts of the resin obtained according to Example 1 are dispersed in 1000 parts of a thickened and fermented sulfite cellulose waste liquor of 32° Bé. and heated for two hours with 50 parts of formaldehyde of 30% strength while stirring the mixture. The reaction product yields, after diluting with water and acidifying, solutions of good tanning properties.

Example 3

120 parts of a resin prepared from 100 parts of laevulose, 350 parts of phenol and 20 parts of concentrated hydrochloric acid with subsequent distillation of 150 parts of phenol in vacuo, are dispersed in 1000 parts of sulfite cellulose waste liquor of 35° Bé. and heated for 1 hour at 80° C. while stirring the mixture.

After diluting with water and acidifying with glycollic acid the reaction product may be immediately used in the usual way.

Example 4

120 parts of a resin prepared from 100 parts of starch, 350 parts of phenol and 50 parts of sodium-bisulfate with subsequent blowing off of the excess phenol, are dispersed in 1000 parts of sulfite cellulose waste liquor at 35° Bé. The diluted solution acidified with acetic acid may be used for tanning.

Example 5

300 parts of a resin prepared from 100 parts of cane sugar, 350 parts of phenol and 25 parts of concentrated hydrochloric acid with subsequent distillation of 40 parts of phenol in vacuo, are dispersed in 1000 parts of sulfite cellulose waste liquor of 28° Bé.

After having been diluted with water and acidified the reaction product when used as a tanning agent, yields a good leather.

Example 6

150 parts of a resin prepared from 100 parts of galactose, 350 parts of phenol and 14.5 parts of concentrated hydrochloric acid with subsequent distillation of 100 parts of phenol in vacuo are dispersed in 1000 parts of sulfite cellulose waste liquor of 32° Bé. and heated at 90° C. for ½ hour with 60 parts of formaldehyde of 30% strength while stirring the mixture.

Example 7

80 parts of a resin prepared from 100 parts of bleached cotton, 350 parts of phenol and 24 parts of concentrated hydrochloric acid with subsequent blowing off of the excess phenol by means of steam, are dispersed in 1000 parts of a fermented sulfite cellulose waste liquor of 35° Bé. at 100° C.

The tanning action is the same as in the above examples.

Example 8

100 parts of a resin prepared from 100 parts of xylose, 350 parts of phenol and 21 parts of concentrated hydrochloric acid with subsequent distillation of 150 parts of phenol in vacuo are dispersed in 1000 parts of sulfite cellulose waste liquor of 28° Bé. at 70° C.

The tanning action is the same as aforementioned.

Example 9

50 parts of a resin prepared from 100 parts of potato flour, 350 parts of phenol and 5 parts of thionyl chloride with subsequent blowing off of the excess phenol by means of steam, are dispersed in 1000 parts of sulfite cellulose waste liquor of 35° Bé. and heated 1 hour with 20 parts of acetaldehyde at 70° C. The tanning action is the same as aforementioned.

Instead of potato flour potato flakes may be used with the same effect.

Example 10

80 parts of a resin prepared from 100 parts of rye straw, 350 parts of phenol and 15 parts of concentrated hydrochloric acid with subsequent distillation of 180 parts of phenol, are dispersed in 1000 parts of sulfite cellulose waste liquor of 35° Bé. and heated for 2 hours at 50° C. with 40 parts of formaldehyde of 30% strength while stirring the mixture.

Example 11

100 parts of a resin prepared from 100 parts of wheat, 250 parts of phenol and 10 parts of concentrated sulfuric acid are dispersed in 1000 parts of sulfite cellulose waste liquor of 32° Bé. and heated for ½ hour to 110° C. while stirring with 40 parts of formaldehyde of 30% strength.

The tanning action is the same as above.

Instead of wheat other cereals may be used.

Example 12

100 parts of a resin prepared from 100 parts of soy-bean cake, 350 parts of phenol and 7 parts of phosphorus trichloride with subsequent blowing off of the excess phenol by means of steam, are dispersed in 1000 parts of sulfite cellulose waste liquor of 35° Bé. and condensed for 1 hour at 80° C. with 60 parts of formaldehyde of 30% strength.

The tanning action is the same as in the above examples.

Instead of soy-bean cake cakes of peanut, coconut or palmkernel may be used.

Example 13

150 parts of a resin prepared from 100 parts of beech-wood sawdust, 350 parts of phenol and 30 parts of concentrated hydrochloric acid with subsequent distillation of 140 parts of phenol in vacuo are dispersed in 1000 parts of sulfite cellulose waste liquor of 32° Bé. and heated for 1 hour at 90° C. with 80 parts of formaldehyde of 30% strength while stirring the mixture.

The tanning action is the same as above mentioned.

Instead of beech-wood, pine-wood may be used.

We claim:

1. The process of preparing tanning substances which comprises treating a lignin sulfonic acid compound selected from the group consisting of lignin sulfonic acid and the soluble salts thereof with a condensation product of an aromatic hydroxy compound selected from the group consisting of the phenols and the naphthols and a carbohydrate.

2. The process of preparing tanning substances which comprises incorporating with sulfite cellulose waste liquor a condensation product being dispersible therein of an aromatic hydroxy compound selected from the group consisting of the phenols and the naphthols and a carbohydrate.

3. The process of preparing tanning substances which comprises incorporating with sulfite cellulose waste liquor a condensation product being dispersible therein of an aromatic hydroxy compound selected from the groups consisting of the phenols and the naphthols and a carbohydrate and treating the resulting product with an aldehyde.

4. The process of preparing tanning substances which comprises incorporating with sulfite cellulose waste liquor a condensation product being dispersible therein of an aromatic hydroxy compound selected from the group consisting of the phenols and the naphthols and a carbohydrate and treating the resulting product with formaldehyde.

5. As a new product for the use as a tanning substance the product obtainable by incorporating with a lignin sulfonic acid compound selected from the group consisting of lignin sulfonic acid and the soluble salts thereof a condensation product of an aromatic hydroxy compound selected from the group consisting of the phenols and the naphthols and a carbohydrate.

6. As a new product for use as a tanning substance the product obtainable by incorporating with sulfite cellulose waste liquor a condensation product being dispersible therein of an aromatic hydroxy compound selected from the group consisting of the phenols and the naphthols and a carbohydrate.

7. As a new product for use as a tanning substance the product which is substantially identical with that obtainable by treating with an aldehyde a sulfite cellulose waste liquor having been incorporated with a condensation product of an aromatic hydroxy compound selected from the group consisting of the phenols and the naphthols and a carbohydrate.

8. As a new product for use as a tanning substance of a product which is substantially identical with that obtainable by aftertreating with formaldehyde a sulfite cellulose waste liquor having been incorporated with a condensation product of an aromatic hydroxy compound selected from the group consisting of the phenols and the naphthols and a carbohydrate.

RUDOLF FINGADO.
HANS HERTLEIN.